(12) United States Patent
Garfinkel

(10) Patent No.: US 6,993,661 B1
(45) Date of Patent: Jan. 31, 2006

(54) SYSTEM AND METHOD THAT PROVIDES FOR THE EFFICIENT AND EFFECTIVE SANITIZING OF DISK STORAGE UNITS AND THE LIKE

(76) Inventor: Simson L. Garfinkel, 634 Pleasant St., Belmont, MA (US) 02478

( * ) Notice: Subject to any disclaimer, the term of this patent is extended or adjusted under 35 U.S.C. 154(b) by 909 days.

(21) Appl. No.: 09/925,616

(22) Filed: Aug. 9, 2001

(51) Int. Cl.
*G06F 12/14* (2006.01)

(52) U.S. Cl. ...................... 713/193; 713/164
(58) Field of Classification Search .............. 713/189, 713/193, 194, 164, 165, 166; 365/191, 195
See application file for complete search history.

(56) References Cited

U.S. PATENT DOCUMENTS

| | | | | |
|---|---|---|---|---|
| 5,265,159 A | * | 11/1993 | Kung | 713/193 |
| 6,134,660 A | | 10/2000 | Boneh et al. | |
| 6,212,600 B1 | * | 4/2001 | Friedman et al. | 711/112 |
| 6,414,884 B1 | * | 7/2002 | DeFelice et al. | 365/195 |
| 6,507,911 B1 | * | 1/2003 | Langford | 713/193 |
| 2003/0028765 A1 | * | 2/2003 | Cromer et al. | 713/164 |

OTHER PUBLICATIONS

Boneh et al., "A Revocable Backup System", Dept. of Computer Science, Princeton University, Princeton, NJ.

DiCrescenzo, et al., "How to Forget a Secret", Computer Science Dept., University of California, San Diego, LaJolla, CA.

Garfinkel, S., "Web Security, Privacy, and Commerce", O'Reilly & Associates, Sebastopol, CA, p. 280-283, $2^{nd}$ Edition (2002).

Omniva Policy Systems, www.omniva.com, (Aug. 2001) (downloaded from web.archive.org on Aug. 24, 2004).

* cited by examiner

*Primary Examiner*—Matthew Smithers
(74) *Attorney, Agent, or Firm*—Fish & Richardson P.C.

(57) ABSTRACT

An arrangement sanitizes a digital data storage unit, such as a disk data storage unit, by encrypting the information that is stored thereon. When the previously-stored information is retrieved from the digital data storage system storage unit, the information is decrypted prior to being provided to the device that requested retrieval of the data. If the digital data storage unit is to be sanitized, the key or keys that used to at least decrypt the data stored on the digital data storage unit are discarded or made unavailable for use in decrypting the encrypted digital data, thereby making the unencrypted data unavailable. Any of a number of types of encryption/decryption methodologies can be used, including a symmetric key methodology, an asymmetric key methodology such as a public key/private key methodology, or any of a number of other encryption/decryption methodologies.

41 Claims, 1 Drawing Sheet

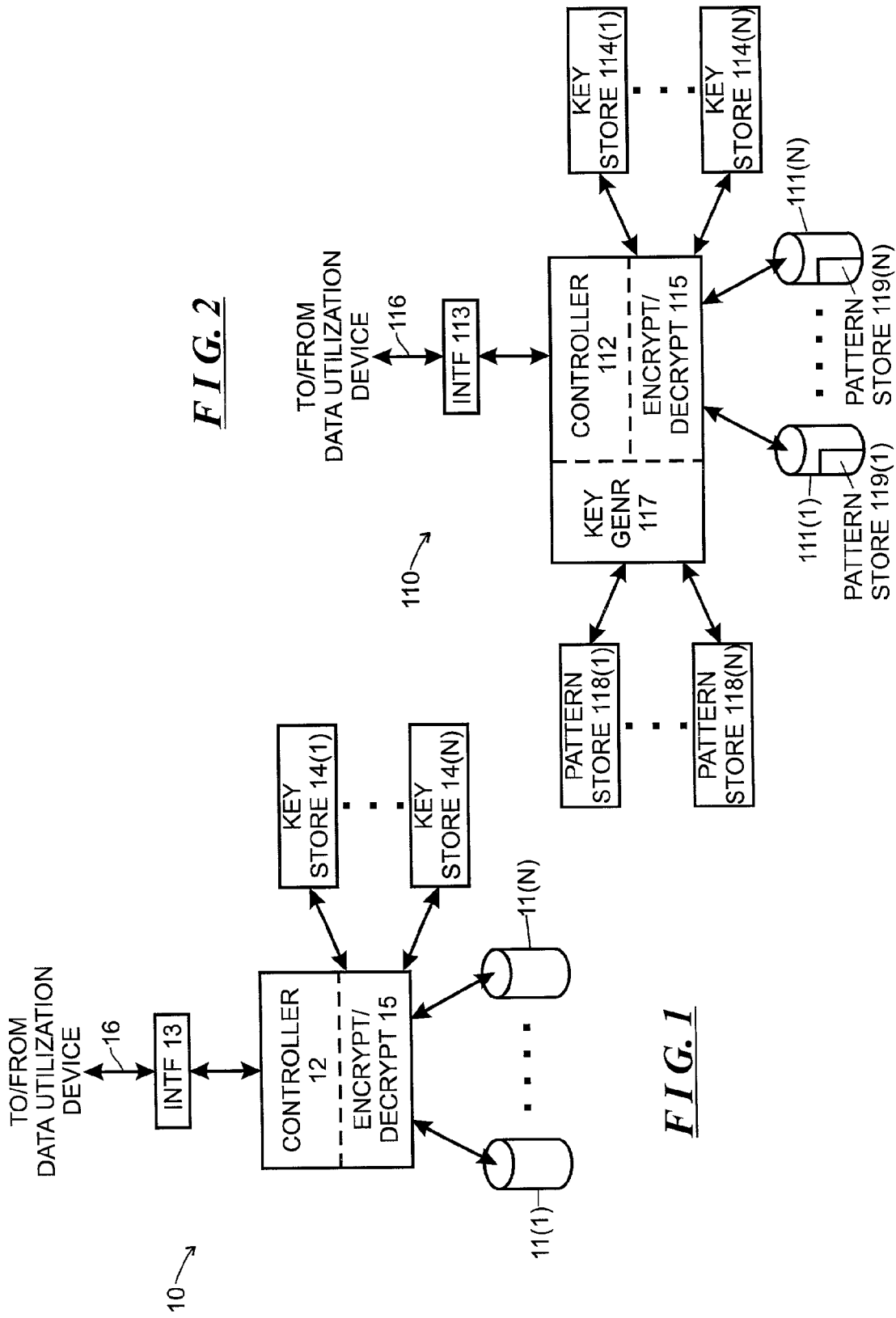

SYSTEM AND METHOD THAT PROVIDES FOR THE EFFICIENT AND EFFECTIVE SANITIZING OF DISK STORAGE UNITS AND THE LIKE

FIELD OF THE INVENTION

The invention relates generally to the field of digital data processing and storage, and more specifically to systems and methods that provide for sanitizing of disk storage units and the like.

BACKGROUND OF THE INVENTION

Digital computers, mass digital data storage subsystems and the like typically include disk storage units to provide for relatively long-term storage of digital data. It is often necessary to remove a disk storage unit from a computer, mass storage subsystem, etc., in which it formed component. This may occur, for example, if it is necessary to remove the disk storage unit for repair, if it is necessary to replace the disk storage unit, if the computer, mass storage subsystem, etc., is to be discarded, or for other reasons that will be apparent to those skilled in the art.

Data stored in a disk storage unit is often confidential to the organization that maintains the computer, mass storage subsystem, etc., in which the disk storage unit forms a component. Several problems can arise in connection with maintaining the confidentiality of the data that is stored in a disk storage unit. For example, disk storage units store data, organized into files, in magnetic form. Typically, when a file is deleted, the data is not erased from the disk storage unit, but instead information detailing the locations of the data comprising the respective file is deleted from tables that are maintained therefor by the computer, mass storage subsystem, etc. Accordingly, merely erasing files from a disk storage unit will not serve to erase the data contained in the files. The data can be recovered using any of a number of conventional data recovery techniques.

Even if efforts are made to sanitize a disk storage unit, that is, to erase the data stored in a disk storage unit, to over-write the data with other data, or to perform other sanitizing operations that will be apparent to those skilled in the art, it is often still possible to recover the erased or over-written data, since it is not unusual for residual magnetic fields to remain after the erasure or overwriting that can be detected sufficiently for the data represented thereby to be reconstructed. In addition, since the data storage capacity of disk storage units is quite large and growing, the time required to over-write the data stored on a typical disk storage unit even once is prohibitive, and typically data is not considered "wiped" until it has been over-written at least several times, generally with predetermined data patterns.

Moreover, during wiping, a "Trojan horse" program can cause data to be copied from the storage locations in which it is currently stored to spare storage locations on the disk storage unit that may be provided to accommodate the possibility that some of the "regular" storage locations may go bad. If a regular storage location does go bad, the disk storage unit automatically stores the data that is to be stored on the bad regular storage location on a spare storage location that has been allocated therefor. Thereafter, when the data is to be retrieved from a "regular" storage location for which a spare storage location has been allocated, the disk storage unit will automatically retrieve the data from the spare storage location and provide the data to the device that requested the data. Generally, the spare storage locations will be known to the disk storage unit, and not to the device, that is, the computer or the like that stores data in, and retrieves data from the disk storage unit, and so the wiping will be in connection with the regular storage locations and not the spare storage locations. In that case, the data will still be available in the spare storage locations.

Instead of overwriting or wiping a disk storage unit, the contents of a disk storage unit can be erased in a "bulk erasure" operation by bringing the disk storage unit in close proximity to a strong magnetic field to "de-gauss" the disk storage unit. However, de-gaussing a disk storage unit, in addition to erasing the data stored thereon, will also erase formatting information that identifies the storage locations, making the disk storage unit thereafter unusable.

SUMMARY OF THE INVENTION

The invention provides a new and improved system and method for the efficient and effective sanitizing of disk storage units, while additionally providing that the disk storage units can be subsequently used without risking the confidentiality of data previously stored thereon.

In brief summary, generally the invention provides for sanitizing of a digital data storage unit, such as a disk data storage unit, by encrypting the information that is stored thereon. When the previously-stored information is retrieved from the digital data storage system storage unit, the information is decrypted prior to being provided to the device that requested retrieval of the data. If the digital data storage unit is to be sanitized, the key or keys that used to at least decrypt the data stored on the digital data storage unit are discarded or made unavailable for use in decrypting the encrypted digital data, thereby making the unencrypted data unavailable. Any of a number of types of encryption/decryption methodologies can be used, including a symmetric key methodology, an asymmetric key methodology such as a public key/private key methodology, or any of a number of other encryption/decryption methodologies as will be apparent to those skilled in the art.

The decryption key can be provided to the disk storage unit in any of a number of ways that would facilitate discarding of the decryption key when the disk storage unit is to be sanitized. For example, the decryption key may be stored in non-volatile random-access memory ("NVRAM") and available for use in decrypting data retrieved from the disk storage unit. When the disk storage unit is to be sanitized, the NVRAM can be made unavailable to the person or entity that has possession of the disk storage unit, by, for example, discarding the NVRAM, erasing the NVRAM, destroying the NVRAM, or any other arrangement whereby the contents of the NVRAM are unavailable to the person or entity that has possession of the disk storage unit. Since this makes the decryption key unavailable to the person or entity that has possession of the disk storage unit, the person or entity that has possession of the disk storage unit will be unable to retrieve the data in unencrypted form.

Alternatively, some or all of the decryption key can be stored on the disk storage unit itself, and another portion provided in, for example, an integrated circuit ("IC") chip, and the key obtained by performing a selected processing operation in connection with the portion of the key stored on the disk storage unit and the portion stored on the IC chip. For example, the decryption key can be formed by concatenating the portion stored on the IC chip with the portion stored on the disk storage unit. Alternatively, the decryption key can be formed by performing an exclusive-OR ("XOR") operation in connection with the portion stored on the disk storage unit and the portion stored on the IC chip. Other types of processing operations that can be used in connection with the portion stored on the disk storage unit and the portion stored on the IC chip, which can be used to generate a decryption key, will be apparent to those skilled in the art. When the disk storage unit is to be sanitized, the IC chip can be removed, destroyed, or the like, which can make it impossible to reconstruct the key(s).

BRIEF DESCRIPTION OF THE DRAWINGS

This invention is pointed out with particularity in the appended claims. The above and further advantages of this invention may be better understood by referring to the following description taken in conjunction with the accompanying drawings, in which:

FIG. 1 is a functional block diagram of a mass storage subsystem including a system that provides for the efficient and effective sanitizing of disk storage units included therein, constructed in accordance with the invention; and FIG. 2 is a functional block diagram of a second embodiment of a mass storage subsystem including a system that provides for the efficient and effective sanitizing of disk storage units included therein, constructed in accordance with the invention.

DETAILED DESCRIPTION OF AN ILLUSTRATIVE EMBODIMENT

FIG. 1 is a functional block diagram of a mass storage subsystem 10 including a system that provides for the efficient and effective sanitizing of disk storage units included therein, constructed in accordance with the invention. With reference to FIG. 1, the mass storage subsystem 10 includes one or more disk storage units 11(1) through 11(N) (generally identified by reference numeral 11($n$)), a controller 12, an interface 13 and one or more key stores 14(1) through 14(N) (generally identified by reference numeral 14($n$)). Each disk storage unit 11($n$) stores digital data provided to the mass storage subsystem 10 by an external data utilization device (not shown), which digital data can later be retrieved, by the same or a different data utilization device, for usage. The data utilization device(s) may include any of a number of types of devices, including, but not limited to, computers, including personal computers, computer workstations, mini- and mainframe computers, that retrieve data from the mass storage subsystem 10, process the data, and provide processed data to the mass storage subsystem 10 for subsequent storage. In addition, the data utilization device(s) may include any of a number of types of other devices, including data visualization devices that display the data, in text, image or any other form, to a user, devices for producing hardcopy output, network or other communication devices for transferring data over a network or other communication medium to other data utilization devices, backup devices for producing backup copies of data stored on the mass storage subsystem 10, as well as any of a number of other types of devices that can produce and/or make use of digital data.

The interface 13 connects to one or more of the data utilization devices over a communication link 16. The communication link 16 may be any of a number of types of communication links over which information in digital form may be transferred. The interface 13 receives storage retrieval requests from data utilization devices over the communication link 16. A storage request initiates a storage operation in connection with the mass storage subsystem 10, to facilitate the storage of data on one or more of the disk storage units 11($n$). Storage requests may be accompanied by the data to be stored, or the data may be provided to the mass storage subsystem 10 separately from the request. A retrieval request initiates a retrieval operation to enable data to be retrieved from one or more of the disk storage units 11($n$). After the data has been retrieved, it can be transferred by the interface 13 over the communication link 16 to the device that issued the retrieval request, or to one or more other devices as directed by the retrieval request.

After the interface 13 has received a storage or retrieval request, it will provide the request to the controller 12 for processing. The controller performs a number of operations in connection with the mass storage subsystem 12, including scheduling of storage and retrieval operations by the respective disk storage units 11($n$), buffering of data to be stored in a storage operation pending storage in a disk storage unit 11($n$), buffering of data retrieved from a disk storage unit 11($n$) prior to transmission to the destination data utilization device by the interface 13, and the like.

In addition, the controller 12 includes an encryption/decryption module 15 that performs an encryption operation in connection with data to be stored on a disk storage unit 11($n$) to encrypt the data before it is transferred thereto for storage, and a decryption output in connection with data retrieved from a disk storage unit 11($n$) to decrypt the data after it has been retrieved and before it is transferred by the interface 13 to the destination data utilization device. When performing an encryption or decryption operate in connection with data to be stored on or that has been retrieved from a disk storage unit 11($n$), the encryption/decryption module 15 makes use of a key stored in a correspondingly-indexed key store 14($n$). The encryption/decryption module 15 may make use of any of a number of encryption/decryption methodologies, including a symmetric key methodology, an asymmetric key methodology such as a public key/private key methodology, or any of a number of other encryption/decryption methodologies as will be apparent to those skilled in the art. If the encryption/decryption module 15 makes use of a symmetric key methodology in connection with a disk storage unit 11($n$), the key store 14($n$) will store one key that it will use for both encryption of data to be stored and decryption of data that has been retrieved. On the other hand, if the encryption/decryption module makes use of an asymmetric key methodology in connection with a disk storage unit 11($n$), the key store 14($n$) will store two keys, namely, an encryption key that it will use for encryption of data to be stored and a decryption key that it will use for decryption of data that has been retrieved. It will be appreciated that the encryption/decryption module 15 may make use of different methodologies for different ones of the disk storage units 11($n$), in which case one or more of the key stores 14($n$) may store one key used for both encryption and decryption, and others may store two keys, one used for encryption and the other used for decryption. In addition, it will be appreciated that data stored on one or more of the disk storage units 11($n$) may not be encrypted, in which case no key need be provided therefor.

As noted above, one or more of the disk storage units 11($n$) generally store data provided thereto by the controller 12 in encrypted form. For the disk storage units 11($n$) for which data is stored in encrypted form, as long as the key is available to decrypt the data stored on the disk storage unit 11($n$), the data stored on the disk storage unit 11($n$) can be decrypted and provided to a data utilization device. Accordingly, if it is desired to make the data stored on a disk storage unit 11($n$) unavailable for access, at least in unencrypted form, the key that is used for decryption is discarded. This can be accomplished in a number of ways. For example, the key store 14(n) can merely be erased, if it the key store 14(n) is in the form of a volatile memory. Alternatively, if the key store 14(n) is in the form of a non-volatile memory, the key store 14(n) can be removed from the mass storage subsystem 10. In that case, erasure or destruction of the non-volatile memory comprising the key store 14(n) can ensure that the data stored on the disk storage unit 11(n) will remain unavailable for access in unencrypted form; the non-volatile memory can be erased using any of a number of conventional erasure techniques, including, for example, application of a selected voltage to the circuitry comprising the key store. As another alternative, the key store 14(n) can comprise a selected storage location on the disk storage unit 11(n) itself, in which case the key can be erased by erasing the selected storage location. As yet another alternative, the key or keys to be used in connection with a disk storage unit 11(n) can initially be stored on the disk storage unit, and thereafter copied by the controller 12 to a separate volatile or non-volatile key store 14(n); in that case, when it is desired to make the data on the disk storage unit 11(n) unavailable in unencrypted form, operations can be performed in a manner similar to those described above in connection with both the disk storage unit 11(n) and the key store 14(n).

If the key or keys used by the encryption/decryption module 15 to encrypt data to be stored on a disk storage unit 11(n), and to decrypt data retrieved from the respective disk storage unit 11(n), are stored in a key store 14(n) separate and apart from the respective disk storage unit 11(n), the key or keys may be initially provided in a number of ways. For example, the key(s) can be initially stored on the disk storage unit 11(n) and copied by the controller 12 to the respective key store 14(n) as part of an initialization procedure when the disk storage unit is first installed in the mass storage subsystem 10, when the mass storage subsystem 10 is first powered on or configured, or as part of any other procedure as will be apparent to those skilled in the art. The controller 12 may also enable the disk storage unit 11(n) to erase the key(s) from the disk storage unit 11(n) if, for example, the key store 14(n) is a non-volatile memory. Alternatively or in addition, the key(s) may be provided in machine readable form on another machine readable medium that may be read by the controller 12 using a suitable reading device (not separately shown).

As a further alternative, the controller may be provided with a key generator module that can generate the key(s) to be used with the disk storage units. One illustrative embodiment thereof will be described in connection with FIG. 2. FIG. 2 depicts a mass storage subsystem 110 that includes one or more disk storage units 111(n), an interface 113 connected to a communication link 116, key store(s) 114(n) and a controller 112 that generally correspond to and operate in a manner similar to respective disk storage unit(s) 11(n), interface 13, communication link 116, key stores 14(n) and controller 112, except as follows.

In addition to an encryption/decryption module 115, which corresponds to and operates in a manner similar to encryption/decryption module 15, the controller 112 is also provided with a key generator 117 that generates one or more keys for a disk storage unit 111(n) by use of a bit pattern stored on, for example, the respective disk storage unit 111(n) itself and another bit pattern. The bit pattern stored on the respective disk storage unit 111(n) may be stored on, for example, a storage location on the disk storage unit identified as pattern store 119(n). The other bit pattern used by the key generator 117 in generating one or more keys for the disk storage unit 111(n) may be provided in another pattern store 118(n), which may comprise a component of the mass storage subsystem 110, a machine-readable medium that is readable by an appropriate reading device, or the like. The mass storage subsystem 110 may include a single pattern store for storing a bit pattern that can be used for all disk storage unit(s) included therein, a plurality of pattern stores 118(n) each of which stores a bit pattern for a correspondingly-indexed disk storage unit 111(n), or a plurality of pattern stores each of which stores a bit pattern that will be used in connection with generating one or more keys for selected ones of the disk storage units 111(n). The key generator 117 can perform any of a number of processing operations in connection with the bit patterns, which may include concatenating the bit patterns together, exclusive-ORing ("XORing") some or all of the bit patterns together, or any other types of processing operations as will be apparent to those skilled in the art.

When it is desired to sanitize a disk storage unit 111(n) in the mass storage subsystem 110, the decryption key can be made unavailable by erasing or destroying the key store 114(n) and erasing or destroying one or both of the pattern stores 118(n), 119(n), thereby to make one or both of the bit patterns stored therein unavailable. Making one of the bit patterns unavailable will generally suffice to make regeneration of the key(s) difficult if not impossible.

The invention provides a number of advantages. In particular, the invention provides an arrangement whereby a disk storage unit can be efficiently and effectively sanitized in such a manner that it can subsequently provided to a repair facility, be used in another environment, and the like, while maintaining the confidentiality of the data stored thereon. This is accomplished by providing that the data stored on the disk storage unit is encrypted, and decrypted during a retrieval operation, and further providing that the key used in decrypting the data be unavailable when it is desired to sanitize the disk storage unit. The key used in decrypting the data can be made unavailable by, for example, erasing or destroying a store in which the key is stored; if the key is stored in multiple stores, preferably all of the stores will be, for example, erased or destroyed so that the key will thereafter be unavailable for use in decryption. Without the key, the data stored on the disk storage unit generally cannot be retrieved in unencrypted form, in which case the data will remain confidential if the disk storage unit is provided to an entity other than that for which the data comprises confidential information.

It will be appreciated that a number of changes and modifications may be made to the arrangement described herein. As noted above, any of a number of conventional encryption/decryption methodologies may be used, including both symmetric key and asymmetric key methodologies. It will be appreciated that generally the ability of an encryption/decryption methodology to maintain the confidentiality of the encrypted data will reflect the security of the methodology and the number of bits comprising the key(s) used in encryption and decryption. In addition, it will be appreciated that, if it is desired to have the data stored on the disk storage unit available in unencrypted form after the disk storage unit has been sanitized, it will generally be desirable to backup the data before the disk storage unit is sanitized, using any of a number of conventional backup arrangements. The data may be backed up directly onto another disk storage unit, or onto a backup medium such as tape, after which it can be loaded onto another disk storage unit for subsequent retrieval.

Although the arrangement has been described as being used in connection with disk storage units, it will be appreciated that the arrangement can also be used in connection with other types of digital data storage arrangements, including storage subsystems that emulate disk storage units but make use of storage media other than magnetic disks.

It will be appreciated that a system in accordance with the invention can be constructed in whole or in part from special purpose hardware or a general purpose computer system, or any combination thereof, any portion of which may be controlled by a suitable program. Any program may in whole or in part comprise part of or be stored on the system in a conventional manner, or it may in whole or in part be provided in to the system over a network or other mechanism for transferring information in a conventional manner. In addition, it will be appreciated that the system may be operated and/or otherwise controlled by means of information provided by an operator using operator input elements (not shown) which may be connected directly to the system or which may transfer the information to the system over a network or other mechanism for transferring information in a conventional manner.

The foregoing description has been limited to a specific embodiment of this invention. It will be apparent, however, that various variations and modifications may be made to the invention, with the attainment of some or all of the advantages of the invention. It is the object of the appended claims to cover these and such other variations and modifications as come within the true spirit and scope of the invention.

What is claimed as new and desired to be secured by Letters Patent of the United States is:

1. A digital data storage subsystem for storing data in digital form comprising:
   A. a storage medium configured to store digital data;
   B. a storage control module configured to
      i. in response to a storage request requesting storage of digital data, receive the digital data that is to be stored in response to the storage request from a source, encrypt the received digital data using a selected encryption key and enable the encrypted digital data to be stored on the storage medium; and
      ii. in response to a retrieval request requesting retrieval of digital data, enable at least one selected portion of the encrypted digital data to be retrieved from the storage medium, decrypt the retrieved encrypted digital data using a selected decryption key, and provide the decrypted digital data to a destination; and
   C. a sanitization control module configured to, in response to a sanitization request, make the decryption key unavailable to the storage control module, thereby disabling the storage control module from thereafter decrypting the encrypted digital data stored on the storage medium.

2. A digital data storage system as defined in claim 1 in which the storage medium is a magnetic medium, in which the encrypted digital data is stored in magnetic form.

3. A digital data storage system as defined in claim 2 in which the magnetic medium is a disk.

4. A digital data storage system as defined in claim 1 in which the storage medium is an electronic medium, in which the encrypted digital data is stored in electronic form.

5. A digital data storage system as defined in claim 1 in which the storage control module is configured to make use of a symmetric key encryption and decryption methodology in encrypting the digital data and decrypting the encrypted digital data.

6. A digital data storage system as defined in claim 1 in which the storage control module is configured to make use of an asymmetric key encryption and decryption methodology in encrypting the digital data and decrypting the encrypted digital data.

7. A digital data storage system as defined in claim 1, the digital data storage system further comprising a decryption key store configured to store the decryption key, and the storage control module is configured to make use of the decryption key stored in the decryption key store in decrypting the encrypted digital data.

8. A digital data storage system as defined in claim 7 in which the sanitization control module is configured to make the decryption key unavailable to the storage control module by wiping the decryption key from the decryption key store.

9. A digital data storage system as defined in claim 8 in which the sanitization control module is configured to wipe the decryption key from the decryption key store by erasing the decryption key store.

10. A digital data storage subsystem as defined in claim 7, wherein the decryption key store is included on the storage medium.

11. A digital data storage system as defined in claim 1, the digital data storage system further comprising a key generator configured to generate the decryption key.

12. A digital data storage system as defined in claim 11 in which the key generator module is configured to generate the decryption key from two bit patterns provided thereto using a predetermined generation methodology.

13. A digital data storage system as defined in claim 12 in which the key generator module is configured to generate the decryption key by concatenating the bit patterns together.

14. A digital data storage system as defined in claim 12 in which the key generator module is configured to generate the decryption key by exclusive-ORing the bit patterns together.

15. A digital data storage system as defined in claim 12 which the key generator module is configured to store the decryption key in a decryption key store, and the sanitization control module is configured to make the decryption key unavailable by making the decryption key and at least one of the bit patterns unavailable.

16. A digital data storage subsystem as defined in claim 1, the digital data storage subsystem further comprising a decryption key store configured to store a decryption key, wherein the storage control module is configured to allow access to the stored information without disclosing the decryption key to the source of the storage request.

17. A digital data storage subsystem as defined in claim 1, the digital data storage subsystem further comprising an interface for communication with a data utilization device over a communications link.

18. A computer program product for use in connection with a processor to provide a sanitizing subsystem for sanitizing a digital data storage subsystem for storing data in digital form, the computer program product comprising:
   A. a storage control module configured to enable the processor to
      i. in response to a storage request requesting storage of digital data, receive the digital data that is to be stored in response to the storage request from a source, encrypt the received digital data using a selected encryption key and enable the encrypted digital data to be stored on the storage medium; and
      ii. in response to a retrieval request requesting retrieval of digital data, enable at least one selected portion of the encrypted digital data to be retrieved from the storage medium, decrypt the retrieved encrypted digital data using a selected decryption key, and provide the decrypted digital data to a destination; and B. a sanitization control module configured to enable the processor to, in response to a sanitization request, make the decryption key unavailable to the storage control module, thereby disabling the storage control module from thereafter decrypting the encrypted digital data stored on the storage medium.

19. A computer program product as defined in claim 18 in which the storage control module is configured to enable the processor to make use of a symmetric key encryption and decryption methodology in encrypting the digital data and decrypting the encrypted digital data.

20. A computer program product as defined in claim 18 in which the storage control module is configured to enable the processor to make use of an asymmetric key encryption and decryption methodology in encrypting the digital data and decrypting the encrypted digital data.

21. A computer program product as defined in claim 18, in which the storage control module is configured to enable the processor to make use of the decryption key stored in a decryption key store in decrypting the encrypted digital data.

22. A computer program product as defined in claim 21 in which the sanitization control module is configured to enable the processor to make the decryption key unavailable to the storage control module by wiping the decryption key from the decryption key store.

23. A computer program product as defined in claim 22 in which the sanitization control module is configured to enable the processor to wipe the decryption key from the decryption key store by easing the decryption key store.

24. A computer program product as defined in claim 18, the computer program product further comprising a key generator configured to enable the processor to generate the decryption key.

25. A computer program product as defined in claim 24 in which the key generator module is configured to enable the processor to generate the decryption key from two bit patterns provided thereto using a predetermined generation methodology.

26. A computer program product as defined in claim 25 in which the key generator module is configured to enable the processor to generate the decryption key by concatenating the bit patterns together.

27. A computer program product as defined in claim 25 in which the key generator module is configured to enable the processor to generate the decryption key by exclusive-ORing the bit patterns together.

28. A computer program product as defined in claim 25 in which the key generator module is configured to enable the processor to store the decryption key in a decryption key store, and the sanitization control module is configured to enable the processor to make the decryption key unavailable by making the decryption key and at least one of the bit patterns unavailable.

29. A method of operating a digital data storage subsystem for storing data in digital form, the method comprising:
A. a storage control step in which
i. in response to a storage request requesting storage of digital data, the digital data that is to be stored in response to the storage request from a source is received, encrypted using a selected encryption key and the encrypted digital data stored on a storage medium; and ii. in response to a retrieval request requesting retrieval of digital data, retrieving at least one selected portion of the encrypted digital data to be retrieved from the storage medium, decrypted using a selected decryption key, and the decrypted digital data being provided to a destination; and B. a sanitization control step in which, in response to a sanitization request, the decryption key is made unavailable for decryption, thereby disabling the decryption of the encrypted digital data stored on the storage medium.

30. A method as defined in claim 29 in which the storage control step includes the step of making use of a symmetric key encryption and decryption methodology in encrypting the digital data and decrypting the encrypted digital data.

31. A method as defined in claim 29 in which the storage control step includes the step of malting of an asymmetric key encryption and decryption methodology in encrypting the digital data and decrypting the encrypted digital data.

32. A method as defined in claim 29, in which the storage control step includes the step of making use of the decryption key stored in a decryption key store in decrypting the encrypted digital data.

33. A method as defined in claim 32 in which the sanitization control step includes the step of making the decryption key unavailable by wiping the decryption key from the decryption key store.

34. A method as defined in claim 33 in which the sanitization control step includes the step of wiping the decryption key from the decryption key store by erasing the decryption key store.

35. A method as defined in claim 29, the method further comprising a key generator step of generating the decryption key.

36. A method as defined in claim 35 in which the key generator step includes the step of generating the decryption key from two bit patterns provided thereto using a predetermined generation methodology.

37. A method as defined in claim 36 in which the key generator step includes the step of generating the decryption key by concatenating the bit patterns together.

38. A method as defined in claim 36 in which the key generator step includes the step of generating the decryption key by exclusive-ORing the bit patterns together.

39. A method as defined in claim 36 in which the key generator step includes the step of storing the decryption key in a decryption key store, and the sanitization control step includes the step of making the decryption key unavailable by making the decryption key and at least one of the bit patterns unavailable.

40. A mass storage subsystem comprising:
an interface for accepting requests and for passing unencrypted data between a data utilization device and the subsystem;
a store for cryptographic information, wherein the storage subsystem is configured to retain the cryptographic information within the storage subsystem;
a storage control module configured to
receive a storage request and associated data through the interface and to encrypt said data using the cryptographic information prior to passing the encrypted data to a storage medium; and
receive a retrieval request through the interface and to decrypt requested data using the cryptographic information prior to passing the decrypted data to the interface; and a sanitization control module configured to receive a sanitization request and to make at least some of the cryptographic information unavailable to the storage control module to prevent decryption of at least some of the encrypted data passed to the storage medium.

41. The mass storage subsystem as defined in claim 40 wherein the store for cryptographic information is included on the storage medium.

* * * * *

US006993661C1

(12) EX PARTE REEXAMINATION CERTIFICATE (7362nd)
United States Patent
Garfinkel

(10) Number: US 6,993,661 C1
(45) Certificate Issued: Feb. 9, 2010

(54) SYSTEM AND METHOD THAT PROVIDES FOR THE EFFICIENT AND EFFECTIVE SANITIZING OF DISK STORAGE UNITS AND THE LIKE

(75) Inventor: Simson L. Garfinkel, 634 Pleasant St., Belmont, MA (US) 02478

(73) Assignee: Simson L. Garfinkel, Belmont, MA (US)

Reexamination Request:
No. 90/009,152, May 16, 2008

Reexamination Certificate for:
Patent No.: 6,993,661
Issued: Jan. 31, 2006
Appl. No.: 09/925,616
Filed: Aug. 9, 2001

(51) Int. Cl.
*G06F 12/14* (2006.01)

(52) U.S. Cl. ......................................... 713/193; 713/164
(58) Field of Classification Search .................... None
See application file for complete search history.

(56) References Cited

U.S. PATENT DOCUMENTS

| 1,310,719 | A | 7/1919 | Vernam |
| 4,262,329 | A | 4/1981 | Bright et al. |
| 4,558,176 | A | 12/1985 | Arnold et al. |
| 4,757,533 | A | 7/1988 | Allen et al. |
| 5,185,717 | A | 2/1993 | Mori |
| 5,235,641 | A | 8/1993 | Nozawa |
| 5,677,952 | A | 10/1997 | Blakley, III et al. |
| 5,687,237 | A | 11/1997 | Naclerio |
| 5,870,468 | A | 2/1999 | Harrison |
| 5,931,947 | A | 8/1999 | Burns |
| 5,933,498 | A | 8/1999 | Schneck et al. |
| 5,940,507 | A | 8/1999 | Cane |
| 6,073,237 | A | 6/2000 | Ellison |
| 6,134,660 | A | 10/2000 | Boneh et al. |
| 6,249,866 | B1 | 6/2001 | Brundrett |
| 6,345,101 | B1 | 2/2002 | Shukla |
| 6,356,941 | B1 | 3/2002 | Cohen |
| 6,405,315 | B1 | 6/2002 | Burns et al. |
| 6,550,011 | B1 | 4/2003 | Sims, III |
| 6,625,734 | B1 | 9/2003 | Marvit et al. |
| 6,735,693 | B1 | 5/2004 | Hamlin |
| 6,754,827 | B1 | 6/2004 | Cane et al. |
| 6,839,437 | B1 | 1/2005 | Crane et al. |
| 6,857,076 | B1 | 2/2005 | Klein |
| 6,915,435 | B1 | 7/2005 | Merriam |
| 7,003,674 | B1 | 2/2006 | Hamlin |
| 7,020,779 | B1 | 3/2006 | Sutherland |
| 7,093,127 | B2 | 8/2006 | McNulty et al. |
| 7,096,355 | B1 | 8/2006 | Marvit et al. |
| 7,215,771 | B1 | 5/2007 | Hamlin |
| 7,240,197 | B1 | 7/2007 | Yamagami et al. |
| 7,260,724 | B1 | 8/2007 | Dickinson et al. |

OTHER PUBLICATIONS

"Federal Information Processing Standards Publication 1981 Guidelines for Implementing and Using the NBS Data Encryption Standard", Federal Information Processing Standards Publication 74, FIPS Pub 74, National Institute of Standards and Technology, Apr. 1, 1981, 39 pages.

(Continued)

*Primary Examiner*—Woo H. Choi

(57) ABSTRACT

An arrangement sanitizes a digital data storage unit, such as a disk data storage unit, by encrypting the information that is stored thereon. When the previously stored information is retrieved from the digital data storage system storage unit, the informaton is decrypted prior to being provided to the device that requested retrieval of the data. If the digital data storage unit is to be sanitized, the key or keys that used to at least decrypt the data stored on the digital data storage unit are discarded or made unavailable for use in decrypting the encrypted digital data, thereby making the unencrypted data unavailable. Any of a number of types of encryption/decryption methodologies can be used, including a symmetric key methodology, an asymmetric key methodology such as a public key/private key methodology, or any of a number of other encryption/decryption methodologies.

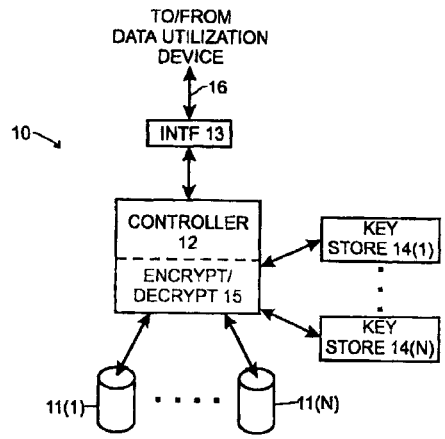

OTHER PUBLICATIONS

"Security Requirements for Cryptographic Modules", Federal Information Processing Standards Publication 140–1, FIPS PUB 140–1, National Institute of Standards and Technology, Jan. 11, 1994, 44 pages.

Provos, Niels, "Encryption Virtual Memory", CITI Technical Report 00–3, Center for Information Technology Integration, University of Michigan, Apr. 25, 2000, 11 pages.

Gobioff, Howard, et al., "Security for Networked Attached Storage Devices", Carnegie Mellon University Computer Sciences Technical Report CMU–CS–97–185, Oct. 1997, 20 pages.

Gobioff, Howard, "Security for a High Performance Commodity Storage Subsystem", Carnegie Mellon University Computer Science Technical Report CMU–CS–99–160, Jul. 1999, 222 pages.

Stinson, Douglas R., "Cryptography: Theory and Practice", CRC Press, Mar. 1, 1995, 228 pages.

IBM Secureway Cryptographic Products IBM 4758 PCI Cryptographic Coprocessor CP/Q Operating System Application Programming Reference Version 1 Driver 16, IBM Research Division, T.J. Watson Research Center, Twenty–Eighth Edition, Chapter 25, "Removing System Resources," pp. 25–1 through 25–10, Jan. 1998.

IBM Secureway Cryptographic Products IBM 4758 PCI Cryptographic Coprocessor CP/Q Operating System C Runtime Library Reference Version 1 Driver 16, IBM Research Division, T.J. Watson Research Center, Thirteenth Edition, Chapter 25, "Removing System Resources," p. 5–26, May 20, 1998.

IBM Secureway Cryptographic Products IBM 4758 PCI Cryptographic Coprocessor CP/Q Operating System Overview for Original Equipment Manufacturers, IBM Security Solutions and Technologies Department, First Edition, Chapter 4, pp. 4–1 through 4–3, Jun. 1998.

ICAT Debugger IBM 4758 Cryptographic Coprocesor Windows NT and Windows 2000, Second Edition, Jan. 2001.

IBM z/OS Integrated Cryptographic Service Facility Administrator's Guide, Second Edition, pp. 13, 70, 111, 115, 233–234, Jun. 2001.

IBM /OS ICSF Trustetd Key Entry Workstation User's Guide 2000, First Edition, pp. 51, 90 and 149, Mar. 2001.

Schneier, "Applied Cryptography Second Edition: Protocols, Algorithms, and Source Code in C," John Wiley & Sons, Inc. pp. 5, 15, 179–181, 185, 213–214, 225;229;563–566 and 569, 1996.

Menezes et al, Handbook of Applied Cryptography, CRC Press, Section 13.7.1, 1997.

Garfinkel, "PGP: Pretty Good Privacy," O'Reilly & Associates, pp. 54–55, 151–153, 168–169, Jan. 1995.

Kahn, "The Codebreakers: The Comprehensive History of Secret Communication from Ancient Times to the Internet, Revised and Updated," Scribner, pp. 186, 348–349, 553 and 897–898, 1996.

IBM z/OS Integrated Cryptographic Service Facility Overview, First Edition, Chapter 3, "ICSF Callable Services and Key Management," Mar. 2001.

IBM 4758 PCI Cryptographic Coprocessor PKCS #11 Support Program Installation Manual for IBM 4758 Models 002 & 023 Release 2.4.1.0, Fifth Edition, Chapter 4, "Loading Software Into The Coprocessor," Jan. 2002.

IBM 4758 PCI Cryptographic Coprocessor Custom Software Installation Manual, Second Edition, Jan. 2001.

Denning, Cryptography and Data Security, Addison–Wesley Publishing Co., pp. 164–169 and 179, 1982.

Anderson et al, "The Steganographic File System," Information Hiding, Second International Workshop, IH '98 Portland, Oregon, USA, Apr. 14–17, 1998, Proceedings, pp. 73–82, 1998.

Antonelli et al., "The Packet Vault: Secure Storage of Network Data," CITI Technical Report 98–5, pp. 1–15, Jun. 25, 1998.

Blaze, "Oblivious Key Escrow," Information Hiding, First International Workshop, Cambridge, UK, May 30–Jun. 1, 1996, Proceedings, pp. 335–343, 1996.

Christy et al, "Mechanism for Secure Off–Site Computer Access," IBM Technical Disclosure Bulletin, pp. 6754–6756, Apr. 1985.

Coleman et al., "Mass Storage System Reference Manual: Version 4," Technical Committee on Mass Storage Systems and Technology, IEEE, pp. 1–38, May 1990.

Dietrich, "Security Enclosure With Elastomeric Contact Stripes," IBM Technical Disclosure Bulletin, pp. 444–445, Feb. 1991.

Double, "Encryption Key Security By Electric Field Destruction of Memory Cells," IBM Technical Disclosure Bulletin, pp. 8–11, Jan. 1989.

Graham et al, "Data Protection at the Volume Level," IBM Technical Disclosure Bulletin, pp. 146–148, Oct. 1988.

Hwang et al, "An Access Control Scheme Based On Chinese Remainder Theorem and Time Stamp Concept," Computers & Security, vol. 15, No. 1, pp. 73–81, 1996.

Moore, "Preventing Access to A Personal Computer," IBM Technical Disclosure Bulletin, pp. 98–100, Sep. 1992.

Scherzer, "Memory Protection in Chip Cards," IBM Technical Disclosure Bulletin, pp. 416–417, Oct. 1989.

Vernam, "Cipher Printing Telegraph Systems for Secret Wire and Radio Telegraphic Communications," Journal of the AIEE, pp. 109–115, Feb. 1926.

Zadok et al, "Cryptfs: A Stackable Vnode Level Encryption File System," Computer Science Department, Columbia University, CUCS–021–98, pp. 1–14, Jun. 1998.

Mallett, "Considerations for Applying Disk Encryptors to Environments Subject to Hostile Overrun," IEEE, pp. 218–222, 1991.

Mauriello,"TCFS: Transparent Cryptographic File System," LINUX Journal, Aug. 1, 1997.

Slusarczuk et al, "Emergency Destruction of Information Storage Media," Institute for Defense Analysis, IDA Report R–321, Dec. 1987.

Whitten et al, "Usability of Security: A Case Study," CMU Computer Science Technical Report CMU–CS–98–155, pp. 1–39, Dec. 18, 1998.

Yee et al, "Secure Coprocessors in Electronic Commerce Applications," Proceedings of the First USENIX Workshop of Electronic Commerce, pp. 155–170, Jul. 11–12, 1995.

"Avoid Litigation: Encrypt Your Data," InfoTech Research Group, Sep. 19, 2006.

Blaze, "A cryptographic File System for Unix," Proceedings of the First ACM Confernece on Computer and Communications Security, pp. 9–16 (1993).

Blaze, "Key Management in an Encrypting File System," USENIX Summer 1994 Technical Conference, pp. 27–35 (Jun. 6–10, 1994).

Cattaneo et al., "The Design and Implementaton of a Transparent Cryptographic Filesystem for UNIX," Proceedings of he FREENIX Track: 2001 UNIX Annual Technical Conference, pp. 199–212 (Jun. 25–30, 2001).

Clark, "Physical Protection of Cryptographic Devices," Lecture Notes in Computer Science, Advances in Cryptology—Eurocrypt '87, pp. 83–93 (Apr. 13–15, 1987).

Comba, "Approaches to Cryptographic Key Management," Symposium on Applied Computing, Proceedings of the Northeast ACM Symposium on Personal Computer Security, pp. 38–45 (1986).

Di Crescenzo et al., "How to Forget a Secret (Extended Abstract)," 16th Annual Symposium on Theoretical Aspects of Computer Science, pp. 500–509 (Mar. 4–6, 1999).

"Disappearing Inc. Makes Old Email Vanish Everywhere; Reduces Corporate Liability as well as Improves Corporate Productivity by Enabling Sensitive Communications via Email—Company Business and Marketing," Edge: Work–Group Computing Report, http://findarticles.com/p/articles/mi_m0WUB/is_1999_Oct_11/ai_56260487/print (Oct. 11, 1999).

Flavin et al., "Data Protection on Magnetic Media Via an Encrypting Controller," IBM Technical Disclosure Bulletin, vol. 30, No. 3, pp. 1284–1285 (Aug. 1987).

Gobioff et al., "Smart Cards in Hostile Environments," Proceedings of the Second USENIX Workshop on Electronic Commerce, pp. 23–28 (Nov. 18–21, 1996).

Gutmann, "Secure Deletion of Data from Magnetic and Solid–State Memory," Proceedings of the Sixth Annual USENIX Security Symposium; Focusing on Applications of Cryptography, pp. 7–89 (Jul. 22–25, 1996).

IBM Crypto Server Management General Information Manual, First Edition (May 2000).

IBM SecureWay Cryptographic Products IBM 4758 PCI Cryptographic Coprocessor Installation Manual, Security Solutions and Technology Department, Second Edition (Mar. 2000) IBM z/OS ICSF Trusted Key Entry Workstation User's Guide, First Edition (Mar. 2001).

Smith, "Verifying Type and Configuration of an IBM 4758 Device: A White Paper," IBM T. J. Watson Research Center, pp. 1–7 (Feb. 8, 2000).

Smith et al., "IBM Research Report: Building a High–Performance, Programmable Secure Coprocessor," IBM Research Division, Computer Science/Mathematics, RC 21102(94393) (Feb. 19, 1998).

Weingart, "Physical Security for the uABYSS System," Proceedings 1987 IEEE Symposium on Security and Privacy, pp. 2–58 (Apr. 27–29, 1987).

IBM Integrated Cryptographic Coprocessors for IBM eServer zSeries 900 and for IBM S/390 Servers (Datasheet), 2000.

IBM z/OS Integrated Cryptographic Service Facility Administrator's Guide, Second Edition (Jun. 2001).

IBM z/OS Integrated Cryptographic Service Facility Overview, First Edition (Mar. 2001).

IBM z/OS Workstation User's Guide 2000.

IBM z/OS Administrators Guide, pp. 13, 115, 233–234.

IBM, SecureWay, UltraCypher Cryptographic Engine (Datasheet) (1998).

Yeh et al., "S/390 CMOS Cryptographic Coprocessor Architecture: Overview and Design Considerations," IBM J. Res. Develop., vol. 43, No. 5/6, pp. 777–794 (Sep./Nov. 1999).

IBM z/OS Integrated Cryptographic Service Facility Administrators's Guide, Second Edition (Jun. 2001).

Johnson et al., "Self–Destructing Diskette," IBM Technical Disclosure Bulletin, vol. 33, No. 1A, pp. 218–219 (June. 1990).

Mallett, "Considerations for Applying Disk Encryptors to Environments Subject to Hostile Overrun," IEEE, pp. 218–222 (1991).

Mauriello, "TCFS: Transparent Cryptographic File System," LINUX Journal, http:www.liuxjournal.com/article/2174. 8 pages (Aug. 1, 1997).

Slusarczuk et al., "Emergency Destruction of Information Storing Media," Institute for Defense Analyses, IDA Report R–321 (Dec. 1987).

Whitten et al., "Usability of Security: A Case Study," Carnegie Mellon University Computer Science Technical Report CMU–CS–98–155, pp. 1–39 (Dec. 18, 1998).

Yee et al., "Secure Coprocessors in Electronic Commerce Applications," Proceedings of the First USENIX Workshop of Electronic Commerce, pp. 155–170 (Jul. 11–12, 1995).

US 6,993,661 C1

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claims 1–3, 5–10, 16, 18–21, 29–31, 40 and 41 are cancelled.

New claims 42–53 are added and determined to be patentable.

Claims 4, 11-15, 22-28 and 32-39 were not reexamined.

42. *A digital data storage subsystem for storing data in digital form comprising:*
   *A. a storage medium that stores digital data, and key material that is used to encrypt the digital data as it is stored on the storage medium and to decrypt the digital data when it is retrieved from the storage medium;*
   *B. a storage control module that*
      *i. in response to a storage request requesting storage of digital data, receives the digital data that is to be stored in response to the storage request from a source, encrypts the received digital data using a selected encryption key and stores the encrypted digital data on the storage medium;*
      *ii. in response to a retrieval request requesting retrieval of digital data, retrieves at least one selected portion of the encrypted digital data from the storage medium, decrypts the retrieved encrypted digital data using a selected decryption key, and provides the decrypted digital data to a destination; and*
      *iii. in association with a given procedure, copies at least the selected decryption key from the storage medium to a key store separate and apart from the storage medium; and*
   *C. a sanitization control module that, in response to a sanitization request, makes the decryption key stored in at least the storage medium unavailable to the storage control module, thereby disabling the storage control module from thereafter decrypting the encrypted digital data stored on the storage medium.*

43. *A computer program product for use in connection with a processor to provide a sanitizing subsystem for sanitizing a digital data storage subsystem for storing data in digital form, the computer program product comprising:*
   *A. a storage control module that enables the processor to*
      *i. in response to a storage request requesting storage of digital data, receive the digital data that is to be stored in response to the storage request from a source, encrypt the received digital data using a selected encryption key and store the encrypted digital data on the storage medium; and*
      *ii. in response to a retrieval request requesting retrieval of digital data, retrieve at least one selected portion of the encrypted digital data from the storage medium, decrypt the retrieved encrypted digital data using a selected decryption key, and provide the decrypted digital data to a destination; and*
      *iii. in association with a given procedure, copy at least the selected decryption key from the storage medium to a key store separate and apart from the storage medium; and*
   *B. a sanitization control module that enables the processor to, in response to a sanitization request, make the decryption key stored in at least the storage medium unavailable to the storage control module, thereby disabling the storage control module from thereafter decrypting the encrypted digital data stored on the storage medium.*

44. *A method of operating a digital data storage subsystem for storing data in digital form, the method comprising:*
   *A. a storage control step in which*
      *i. in response to a storage request requesting storage of digital data, the digital data that is to be stored in response to the storage request from a source is received, encrypted using a selected encryption key and the encrypted digital data stored on a storage medium; and*
      *ii. in response to a retrieval request requesting retrieval of digital data, retrieving at least one selected portion of the encrypted digital data to be retrieved from the storage medium, decrypted using a selected decryption key, and the decrypted digital data being provided to a destination;*
      *iii. in association with a given procedure, at least the selected decryption key is copied from the storage medium to a key store separate and apart from the storage medium; and*
   *B. a sanitization control step in which, in response to a sanitization request, the decryption key stored in at least the storage medium is made unavailable for decryption, thereby disabling the decryption of the encrypted digital data stored on the storage medium.*

45. *A mass storage subsystem comprising:*
   *an interface for accepting requests and for passing unencrypted data between a data utilization device and the subsystem;*
   *a store for cryptographic information, wherein the storage subsystem is configured to retain the cryptographic information within the storage subsystem;*
   *a storage control module configured to*
      *receive a storage request and associated data through the interface and to encrypt said data using the cryptographic information prior to passing the encrypted data to a storage medium; and*
      *receive a retrieval request through the interface and to decrypt requested data using the cryptographic information prior to passing the decrypted data to the interface; and*
      *in association with a given procedure, copy at least the cryptographic information to a key store separate and apart from the store and the storage medium;*
   *a sanitization control module configured to receive a sanitization request and to make at least some of the cryptographic information unavailable to the storage control module to prevent decryption of at least some of the encrypted data passed to the storage medium.*

46. *The digital storage subsystem as described in claim 42 wherein the given procedure is an initialization procedure.*

47. The computer program product as described in claim 43 wherein the given procedure is an initialization procedure.

48. The method as decribed in claim 44 wherein the given procedure is an initialization procedure.

49. The mass storage subsystem as described in claim 45 wherein the given procedure is an initialization procedure.

50. The digital storage subsystem as described in claim 42 in which the storage medium is a magnetic medium, in which the encrypted digital data is stored in magnetic form.

51. The digital storage subsystem as described in claim 42 wherein the selected decryption key corresponds to a storage unit.

52. The computer program product as described in claim 43 wherein the selected decryption key corresponds to a storage unit.

53. The method as described in claim 44 wherein the selected decryption key corresponds to a storage unit.

* * * * *

(12) INTER PARTES REEXAMINATION CERTIFICATE (1043rd)
United States Patent
Garfinkel

(10) Number: US 6,993,661 C2
(45) Certificate Issued: Jan. 26, 2015

(54) SYSTEM AND METHOD THAT PROVIDES FOR THE EFFICIENT AND EFFECTIVE SANITIZING OF DISK STORAGE UNITS AND THE LIKE

(75) Inventor: Simson L. Garfinkel, Belmont, MA (US)

(73) Assignee: Simson L. Garfinkel, Belmont, MA (US)

Reexamination Request:
No. 95/000,543, May 24, 2010

Reexamination Certificate for:
Patent No.: 6,993,661
Issued: Jan. 31, 2006
Appl. No.: 09/925,616
Filed: Aug. 9, 2001

Reexamination Certificate C1 6,993,661 issued Feb. 9, 2010

(51) Int. Cl.
*G06F 12/14* (2006.01)

(52) U.S. Cl.
USPC .......................................... 713/193; 713/164

(58) Field of Classification Search
USPC ......................................................... 713/193
See application file for complete search history.

(56) References Cited

To view the complete listing of prior art documents cited during the proceeding for Reexamination Control Number 95/000,543, please refer to the USPTO's public Patent Application Information Retrieval (PAIR) system under the Display References tab.

*Primary Examiner* — Mark Sager

(57) ABSTRACT

An arrangement sanitizes a digital data storage unit, such as a disk data storage unit, by encrypting the information that is stored thereon. When the previously stored information is retrieved from the digital data storage system storage unit, the information is decrypted prior to being provided to the device that requested retrieval of the data. If the digital data storage unit is to be sanitized, the key or keys that used to at least decrypt the data stored on the digital data storage unit are discarded or made unavailable for use in decrypting the encrypted digital data, thereby making the unencrypted data unavailable. Any of a number of types of encryption/decryption methodologies can be used, including a symmetric key methodology, an asymmetric key methodology such as a public key/private key methodology, or any of a number of other encryption/decryption methodologies.

INTER PARTES REEXAMINATION CERTIFICATE ISSUED UNDER 35 U.S.C. 316

THE PATENT IS HEREBY AMENDED AS INDICATED BELOW.

AS A RESULT OF REEXAMINATION, IT HAS BEEN DETERMINED THAT:

Claims 1-3, 5-10, 16, 18-21, 29-31 and 40-41 were previously cancelled.

Claims 42-53 are cancelled.

Claims 4, 11-15, 17, 22-28 and 32-39 were not reexamined.

* * * * *